United States Patent [19]
Haw

[11] 3,763,436
[45] Oct. 2, 1973

[54] AMPLITUDE INDEPENDENT TIME OF ARRIVAL DETECTOR

[75] Inventor: Waily Haw, Fallbrook, Calif.

[73] Assignee: The United States of America as represented by the Secretary of the Navy, Washington, D.C.

[22] Filed: Dec. 27, 1971

[21] Appl. No.: 212,192

[52] U.S. Cl. ............... 328/147, 307/235, 328/115, 328/150
[51] Int. Cl. .............................................. H03k 5/20
[58] Field of Search ........................... 307/261, 235; 328/116, 117, 147, 155, 115, 150

[56] References Cited
UNITED STATES PATENTS

| 3,584,310 | 6/1971 | Hochfelder | 328/117 X |
| 3,643,170 | 2/1972 | Stanger | 328/155 X |
| 3,037,168 | 5/1962 | Forrer | 328/117 X |
| 2,523,283 | 9/1950 | Dickson | 343/7.7 |

Primary Examiner—Malcolm F. Hubler
Attorney—Richard S. Sciascia et al.

[57] ABSTRACT

A circuit for generating an output pulse with a precise time of occurrence relative to the input trigger signal regardless of varying amplitudes of the input trigger signal.

1 Claim, 4 Drawing Figures

CIRCUIT WAVE FORMS $S_Y$ AND $S_X$ AT DIFFERENT AMPLITUDES

AMPLITUDE INDEPENDENT TIME OF ARRIVAL DETECTOR

BACKGROUND OF THE INVENTION

This invention relates to electrical timing circuits, and particularly to means for accurately establishing the time of arrival of information on an amplitude varying input signal. This is accomplished by generating an output pulse at a precise time of occurrence relative to a fixed point on the input signal regardless of the various amplitudes the input signal may have. To accurately establish the time of arrival information on amplitude varying input signals, typical pulse generating circuits can not be used. In the typical usage of such circuits, the pulse initiation time is dependent on the amplitude of the input trigger signal. For example, as the input trigger signal increases in magnitude, the pulse initiation time occurs sooner, and vice versa. As a result, accurate and precise time of arrival information can not be derived.

Voltage comparator types of circuits, such as the Schmitt trigger and multiar, generate pulses when they are initiated by an input trigger. In the typical usage of such circuits, the pulse initiation time is directly dependent on the amplitude of the input trigger. Relative to a fixed point on the trigger input, the time of occurrence of the generated output pulse varies if the amplitude of the triggering pulse varies. As a result, there is an extreme disadvantage for pulse generators when accuracy and precision requirements must be satisfied under the condition of amplitude varying trigger pulses. Prior art devices which use delay attenuation circuitry involve complex circuits and are limited to one level of output.

The present invention provides a simple device and identical output pulses are generated for each input pulse.

SUMMARY OF THE INVENTION

This invention generates output pulses with a precise time of occurrence from amplitude varying trigger input signals. The precision of the output pulse time of occurrence regardless of amplitude varying input trigger signals is a major advantage over other methods of pulse generation because accurate information can be derived from input trigger pulses whose amplitude varies over a wide dynamic range. The input signal is fed through both a delay line and an attenuator to a voltage comparator. This invention offers a new and simple technique for accurately establishing time of arrival information from amplitude varying input signals. The time of occurrence of the output signal relative to a fixed point on the amplitude varying input signal is accurate and precise. Also, the time of occurrence of the output signal can be adjusted to occur at a particular time by the delay line selection. The simplicity of this circuit permits easy and inexpensive implementation thereof using currently available off-the-shelf items. Further, the output signal is uniform regardless of the shape or magnitude of the input signal.

STATEMENT OF THE OBJECTS OF THE INVENTION

It is an object of the invention, therefore, to provide a device for generating output pulses with precise time of occurrence regardless of amplitude varying input trigger signals which vary over a wide dynamic range.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
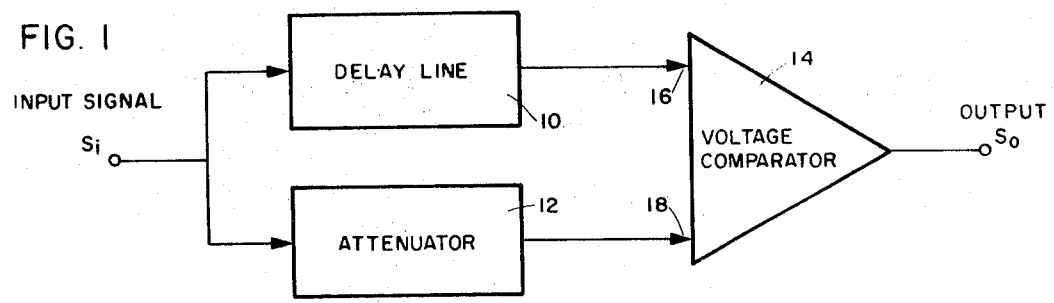
FIG. 1 is a block diagram of the invention.

The block diagram of FIG. 1 shows the functions used for establishing accurate time of arrival information from an amplitude varying input signal for this invention.

As shown in FIG. 1, this invention consists of a delay line 10, a fixed attenuator 12, and a voltage comparator type of circuit 14. The input trigger signal $S_i$ is applied to the delay line and the fixed attenuator. The delay line output signal $S_x$ at point X is a duplicate of the input trigger signal except for a fixed delay time $T_D$ and an attenuation factor $K_1$. The fixed attenuator output signal $S_y$ at point Y is a duplicate of the input trigger signal $S_i$ except for being attenuated by a factor of $K_2$. $K_2$ is less than $K_1$. Delay line 10 delays the input signal $S_i$ for a fixed time $T_D$; attenuator 12 attenuates the input signal $S_i$ more than delay line 10 does, and voltage comparator 14 switches between two levels whenever the relative voltage polarity between its two input terminals 16 and 18 are reversed.

Figure 2:
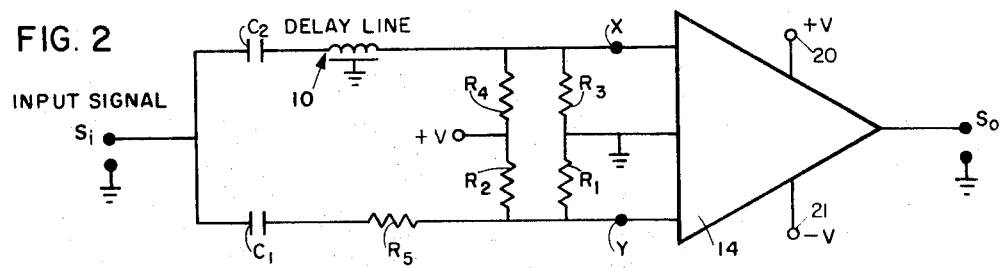
FIG. 2 is a circuit schematic diagram of the preferred embodiment of the invention.

The simplicity of the new technique of this invention is illustrated in the circuit schematic of FIG. 2. The power supply voltages for the circuit are +V and −V provided at terminals 20 and 21 respectively. For this description of how the circuit functions, assume that the output $S_o$ of voltage comparator 14 is at the low level when point Y is positive relative to point X. Therefore, whenever point Y becomes negative relative to point X, the voltage comparator output switches to its high level. And when point Y returns to its positive polarity relative to point X, the voltage comparator switches back to its low level.

For the quiescent condition on the voltage comparator 14, point Y is positive relative to point X by a very small offset voltage (V offset) due to the two voltage dividing networks consisting of $R_1$ with $R_2$, and $R_3$ with $R_4$. Consequently, whenever there is no input signal $S_i$, the output signal $S_o$ remains at the low level.

Figure 3:
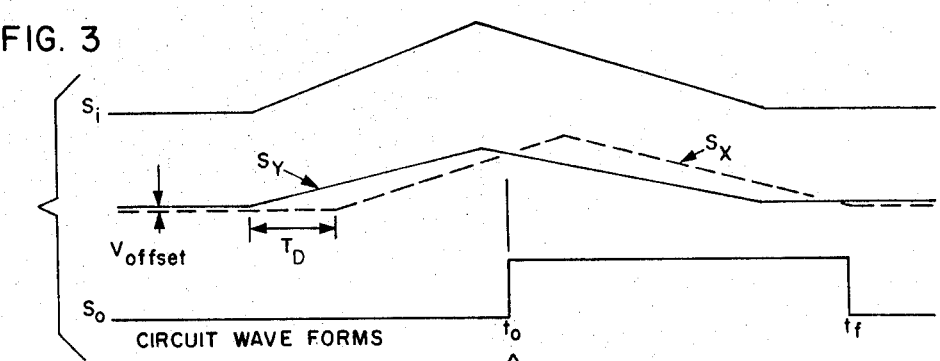
FIG. 3 shows circuit waveforms for a triangular input signal.

When a positive input signal $S_i$ is present, it is applied to point Y through a DC blocking capacitor $C_1$ and resistor $R_5$. The same positive input signal $S_i$ is also applied to point X through a DC blocking capacitor $C_2$ and through the delay line 10. At point X the signal $S_x$ is delayed by a fixed time $T_D$ relative to the signal $S_y$ at point Y due to the delay line. The voltage divider $R_1 - R_2$ is such that the DC voltage at point Y is slightly positive (e.g., 20 millivolts more positive) relative to point X. This will define the input polarities at points Y and X for a specific polarity of $S_o$. Resistor $R_5$ provides the fixed attenuation because it is in series with the parallel combination of resistors $R_1$ and $R_2$. Due to the attenuating network formed by $R_1$, $R_2$, and $R_5$, the signal $S_Y$ at point Y will have less magnitude than the signal $S_X$ at point X. The circuit waveforms for an assumed triangular input signal $S_i$ are shown in FIG. 3. As illustrated in FIG. 3, the positive input trigger signal $S_i$ initially drives point Y more positive, therefore, the voltage comparator output signal $S_o$ remains at the low level. But after the time duration, $T_D$, the delayed signal with greater magnitude arrives at point X and then causes point X to become positive relative to point Y. At this time $t_o$ the voltage comparator output signal $S_o$ switches to its high level and remains until point Y returns positive relative to point X near the end of the delay line output signal. The output signal $S_o$ returns to the low level at time, $t_f$.

Figure 4:
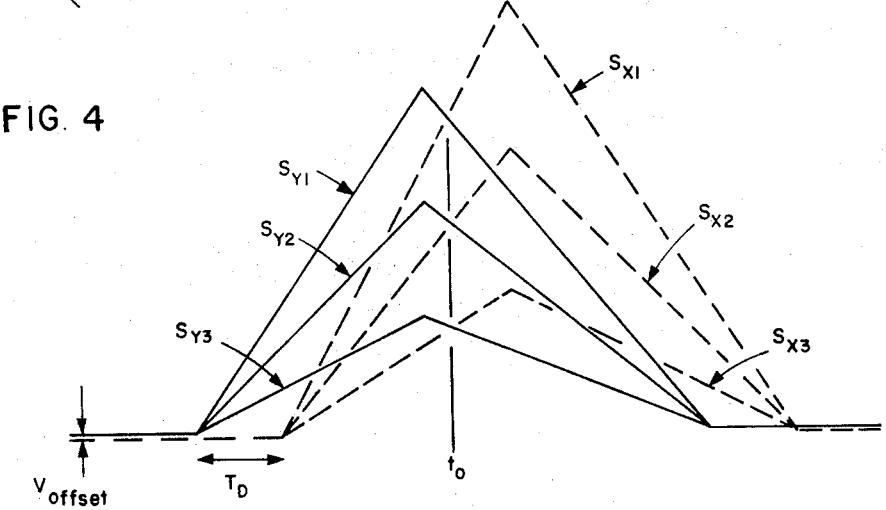
FIG. 4 shows the effects of amplitude varying input signals.

The effects of amplitude varying input signals $S_i$ is illustrated in FIG. 4. Since the ratio of the signal magnitudes at points X and Y is constant, the signal $S_X$ at point X increases or decreases proportionately as the signal $S_Y$ at point Y. Consequently, the polarity reversals between points X and Y always occur at times $t_o$ and $t_f$. In addition, the output signal $S_o$ always begins at time $t_o$ and ends at time $t_f$. Moreover, the relative time of occurrence of the output signal $S_o$ to a fixed point on the input signal $S_i$ will always be the same regardless of the amplitude of the input signal $S_i$; thus providing an accurate, precise and uniform output signal regardless of the shape or magnitude of the input signal.

What is claimed is:

1. A signal time of arrival detector circuit for generating a uniform output pulse with an accurate and precise time of occurrence relative to the input signal regardless of varying amplitudes of the input signal over a wide dynamic range, comprising:
   a. a circuit input terminal to which the input signal is fed;
   b. a voltage comparator means;
   c. delay line means connected between said input terminal and a first input to said voltage comparator, said delay line means delaying the input signal for a fixed time, the time of occurrence of the input being adjustable to occur at a particular time by varying said delay line means;
   d. an attenuator means having its input connected between said input terminal and a second input to said voltage comparator, said attenuator means attenuating the input signal more than said delay line, said attenuator means comprising a resistor network consisting of a first resistor in series with a parallel combination of resistors forming a voltage divider;
   e. said input signal being fed through respective blocking capacitors to both said delay line means and said attenuator means to said voltage comparator means;
   f. voltage means provided for maintaining the second input to said voltage comparator means positive relative to the first input thereto by a small offset voltage during its quiescent condition when there is no input signal to said circuit input terminal whereby the output signal from said voltage comparator means remains at low level;
   g. the output of said voltage comparator means being at low level when the voltage at said second input thereto is positive relative to said first input thereto, said voltage comparator means switching to high level when the voltage at the second input thereto becomes negative relative to the first input and switching back to its low level when the voltage at the second input returns to a positive polarity with respect to the first input, identical output pulses being generated for each input pulse, said pulses being uniform with accurate and precise time of occurrence relative to the input signal regardless of varying amplitudes of the input signal, wherein accurate information is derived from input trigger pulses whose amplitude varies over a wide dynamic range.

* * * * *